F. VYVIAL.
CURRYCOMB AND BRUSH.
APPLICATION FILED SEPT. 3, 1915.
1,171,815.
Patented Feb. 15, 1916.
2 SHEETS—SHEET 1.
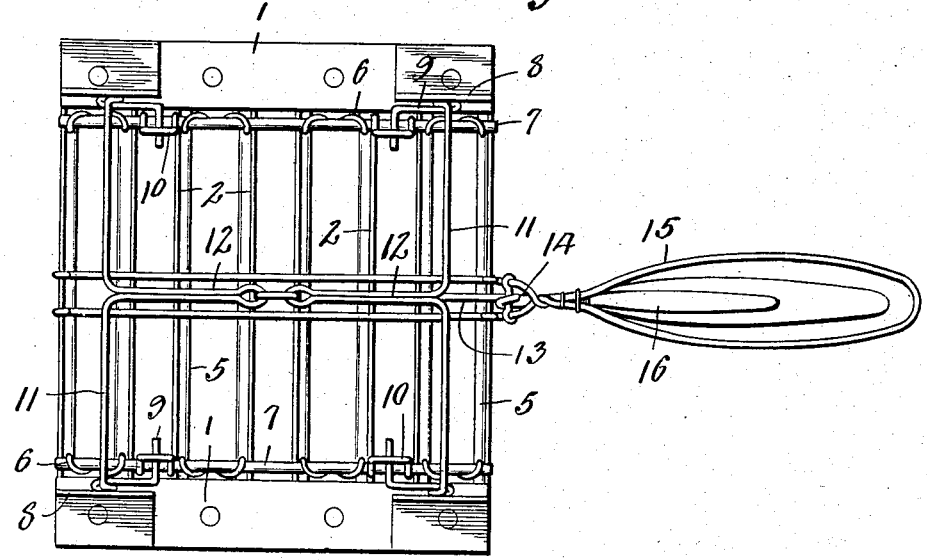
Witnesses
Inventor
F. Vyvial,
By Victor J. Evans
Attorney

UNITED STATES PATENT OFFICE.

FRANK VYVIAL, OF LOUISE, TEXAS.

CURRYCOMB AND BRUSH.

1,171,815.  Specification of Letters Patent.  Patented Feb. 15, 1916.

Application filed September 3, 1915. Serial No. 48,900.

*To all whom it may concern:*

Be it known that I, FRANK VYVIAL, a citizen of the United States, residing at Louise, in the county of Wharton and State of Texas, have invented new and useful Improvements in Currycombs and Brushes, of which the following is a specification.

This invention relates to certain novel and useful improvements in combination currycombs and brushes for animals and has particular application to what may be called a self-cleaning currycomb and brush.

In carrying out the present invention, it is my purpose to provide a combination currycomb and brush wherein the brushing and combing elements will be so arranged and correlated that the brushing elements may be projected beyond the combing elements when it is desired to use the device as a brush, and the brushing elements retracted to expose the combing elements when it is desired to use the device as a currycomb, and wherein the brushes may be so manipulated as to rub against the combs with the effect to clean the combs and the brushes so that dirt and other foreign matter may be removed from the combs and brushes.

It is also my purpose to improve and simplify the general construction of devices of the class described and to provide a combination currycomb and brush which may be manufactured and marketed at comparatively small cost and which may be used effectively and conveniently.

With the above and other objects in view, the invention consists in the construction, combination and arrangement of parts hereinafter set forth in and falling within the scope of the claim.

Figure 3:
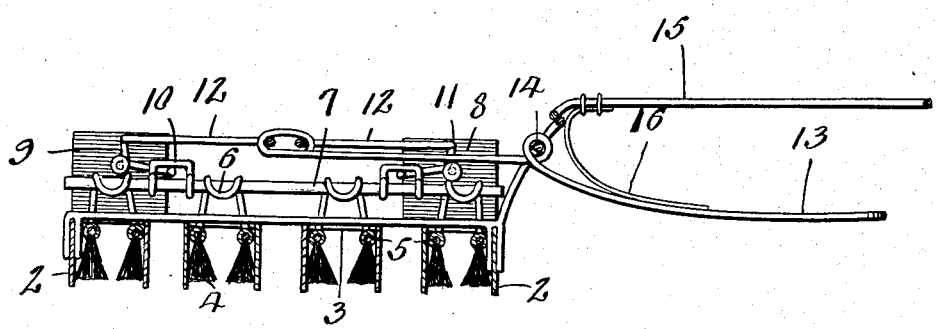
Figure 4:
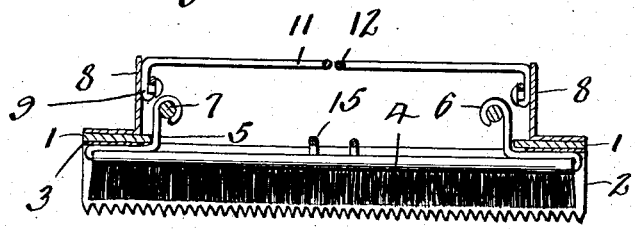
Figure 4:
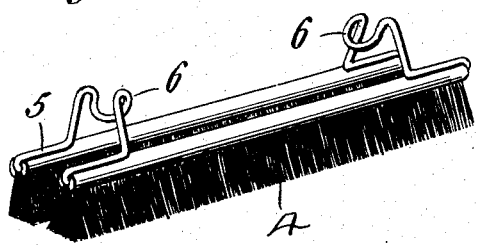

In the accompanying drawings; Figure 1 is a top plan view of a combination currycomb and brush constructed in accordance with the present invention. Fig. 2 is a bottom plan view thereof. Fig. 3 is a longitudinal sectional view through the device. Fig. 4 is a cross sectional view therethrough. Fig. 5 is a perspective view of one of the brushes and the holder therefor removed from the device.

Referring now to the drawings in detail, 1, 1 designate supporting strips spaced apart in parallelism, while 2 indicates combs spanning the space between the strips 1, 1 and having the ends thereof secured to the respective strips. These combs 2 are appropriately spaced apart and disposed parallel with one another. In the present instance, the combs are arranged in pairs and the combs of each pair are connected together through the medium of straps 3 arranged at the ends of the combs and forming the connections between the combs and the strips 1, 1, the straps and strips being riveted together or otherwise appropriately connected. Arranged in juxtaposition to each comb 2 and having one side in contact with the adjacent side of the comb is a brush 4. In the present instance, the brushes 4 between the combs of each pair are connected with a wire holder 5 having the extremities thereof projecting upwardly through the space between the combs and bent upon themselves to form hooks 6. The hooks 6 at each side of the device are mounted upon a rod 7 and these rods 7 are spaced apart in parallelism. Secured to the strips 1, 1 adjacent to the ends thereof respectively and projected outwardly therefrom are lugs 8. Pivoted upon the lugs 8 are arms 9 respectively and the arms 9 on the lugs on each strip project toward each other and are secured to the adjacent portions of the rods 7 through the medium of loose connections 10, while extending across the space between the strips 1, 1 are transverse rods 11, each having the opposite extremities thereof secured to the pivoted ends of corresponding arms 9, and the central portions formed with a lever 12. The levers 12 project toward each other and are pivotally connected with an operating handle 13 fulcrumed between its ends as at 14 to a stationary handle 15 secured to the end combs 2 of the device centrally of such combs and serving as a means whereby the device may be manipulated.

16 designates a spring of any suitable construction interposed between the handles 13 and 15 and acting upon the operating handle 13 to hold the brushes 4 normally inwardly of the combs 2.

In practice, when it is desired to use the device as a currycomb the handle 15 is grasped and the device manipulated in the usual way. To use the device as a brush, the outer end of the handle 13 is swung toward the stationary handle 15 against the action of the spring 16 and in this movement of the operating handle the levers 12 are actuated to swing the rods 11 and arms 9 and so move the rods 7 toward the rear edges of the combs and in this movement of the rods 7, the outer ends of the brushes are projected beyond the toothed edges of the combs so that the brushes may be rubbed over the animal. When it is desired to clean the combs and the brushes, the handle 13 is swung toward and away from the handle 15 so as to move the brushes alternately outwardly and inwardly, thereby enabling the combs to remove the dirt from the brushes and the brushes to clean the combs.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A combination currycomb and brush comprising a plurality of combs spaced apart in parallelism, brushes arranged alongside of the combs, said brushes being arranged in pairs and disposed inwardly of the combs, wire holders connecting the brushes of each pair to each other, rods arranged at opposite sides of the device above said combs and brushes and connected to the ends of the wire holders at the respective sides of the device, lugs arranged adjacent to said rods respectively, arms pivoted upon said lugs, connections between said arms and rods, levers and rods interconnecting all of said arms for simultaneous movement, and means connecting said levers for operating the latter to move the brushes outwardly beyond the combs.

In testimony whereof I affix my signature in presence of two witnesses.

FRANK VYVIAL.

Witnesses:
FRANK FAREK,
W. J. KUBALA.

Copies of this patent may be obtained for five cents each, by addressing the "Commissioner of Patents, Washington, D. C."